United States Patent [19]

Lucas

[11] Patent Number: 4,495,034
[45] Date of Patent: Jan. 22, 1985

[54] WASTE EFFLUENT TREATMENT AND SOLVENT RECOVERY SYSTEM

[76] Inventor: Frank Lucas, Rte. 2, Box 297, Centreville, Md. 21617

[21] Appl. No.: 373,154

[22] Filed: Apr. 29, 1982

Related U.S. Application Data

[63] Continuation of Ser. No. 156,582, Jun. 5, 1980, abandoned, which is a continuation-in-part of Ser. No. 951,877, Oct. 16, 1978, abandoned.

[51] Int. Cl.³ .......................... C02F 1/14; B01D 3/02
[52] U.S. Cl. .................................. 202/181; 202/202; 202/234; 202/236; 159/1 S; 203/1; 203/10; 203/39; 203/89; 203/98
[58] Field of Search ............... 202/202, 234, 236, 176, 202/181; 203/DIG. 1, 10, 11, 1, 41, 39, 89, 98; 159/1 S

[56] References Cited

U.S. PATENT DOCUMENTS

| 1,812,516 | 6/1931 | Dooley | 203/DIG. 1 |
| 2,405,877 | 8/1946 | Delano | 203/DIG. 1 |
| 2,788,316 | 4/1957 | Bjorksten | 203/DIG. 1 |
| 3,159,544 | 12/1964 | Mount | 202/234 |
| 3,468,762 | 9/1969 | Klitzsch | 202/234 |
| 3,775,257 | 11/1973 | Lovrich | 203/DIG. 1 |
| 3,880,719 | 4/1975 | Massie | 203/DIG. 1 |
| 4,036,209 | 7/1977 | Press | 202/234 |
| 4,075,063 | 2/1978 | Tsay et al. | 203/DIG. 1 |

FOREIGN PATENT DOCUMENTS 164679  8/1955 Australia ................. 203/DIG. 1

OTHER PUBLICATIONS

Proceedings Symposium on Saline Water Conversion 1957, M. Telkes, pp. 137–149, (1958) OSW–U.S. Dept. Int.

Primary Examiner—Wilbur L. Bascomb, Jr.
Attorney, Agent, or Firm—Armstrong, Nikaido, Marmelstein & Kubovcik

[57] ABSTRACT

A system for treating waste effluent and recovering solids and solvent material including a reservoir mounted on a stand connected by means to a solvent migrator including an adjustable trough for receiving new solution, a secondary reservoir with a cloth or absorbent material designed to contact the fluid in the secondary reservoir, while parallel to the sun's rays, an automatic leveling means and apparatus for recirculation of waste effluent including a leveling ball, and suction tubing for the recirculation of fluid, a solar unit comprised of glass panels to form a collecting dome with collecting troughs and a bonnet to shade the top of the pyramid formed by the dome panels and mirrors for the reflection of sunlight, all of which is connected to a chemical trap and subsequently a collecting means for the pure product.

2 Claims, 12 Drawing Figures

WASTE EFFLUENT TREATMENT AND SOLVENT RECOVERY SYSTEM

This is a continuation of application Ser. No. 156,582, filed June 5, 1980, which in turn is a continuation-in-part application of application Ser. No. 951,877, filed Oct. 16, 1978, both of which are now abandoned.

BACKGROUND OF THE INVENTION

The present invention relates to a chemical waste effluent treatment and solvent recovery system which is designed to provide for solvent recovery, separation of recyclable chemicals and elimination of water pollution by providing an in situ secondary treatment site. The system, taken in combination, can function as a solar distillation unit, and would thus be solar powered.

The present invention is referred to as the "SOPWETS" as a means of identification. The primary use of the invention is for the recovery of solvents "organics or water" by solar distillation. The system also allows recycling. A further use is the recovery of solutes by precipitation by Electromotive Series. This also allows recycling.

Moreover, the system is an anti-pollution structure because it provides low cost, low effort recovery of solvents and solutes rather than pay for disposal in a landfill or arbitrarily pouring them into sewer or septic systems. The result of the SOPWETS system creates a "Zero Waste Effluent" in a laboratory in that no hazardous chemical waste is discarded by rinsing the final product into a drainage system.

Application of the system includes recovery of pure water from dissolved solids mixtures, recovery of turpentine from paint/turpentine solutions and recovery of volatile organic solvents with trace water or dissolved solid contamination.

The capacity of a single system in a commercial setting is an average of forty-five (45) gallons per year.

Educational institutions, hospitals, clinical laboratories, research labs, and various types of industry often use numerous noxious chemicals, such as in the biology and chemistry areas. Once used for commercial or experimental purposes, the excess chemicals and by-products must be disgarded. Conventionally, these excess chemicals and by-products have been poured down the sink. The result of this action has been contamination of ground water, water systems and the environment in general.

Therefore, the present invention was developed to both recover almost all reusable products from this waste in the form of by-products of excess chemicals and produce in a final product in the form of pure water. The system can recover purified water or some organic solvents. In addition, the system can return metals from solution if the percentage is sufficiently high (e.g. 1%-2%).

Inorganic compounds are usually soluable in water, some may need the addition of a mineral acid or base to aid in the dissolving. Any salt dissolved in water can be recovered in SOPWETS with the added feature of obtaining valuable metals in a relatively pure form.

Separation of inorganic solutions can be accomplished simultaneously by:
1. Precipitation of metals by electromotive series substitution.
2. Precipitation of compounds by exceeding their soluability through the evaporation of solvent.
3. Precipitation of compounds by adding chemicals to initiate a chemical reaction between waste dissolved substances and newly added materials, i.e., addition of chelators.
4. Collection of distilled solvent (water) in product collection bottles.

Past attempts to remedy the defects and drawbacks in the disposal of waste by burial or other means in laboratories and industry have failed. The present invention is a sound, efficient, and economical means of not only recovering reusable materials, but in purifying any leftover product.

Moreover, the system can be used in a sufficient quantity either in educational, industrial, or related settings to handle any particular effluent flow and results in solving problems and bestowing benefits in various ways such as improving local water quality; economic savings in all settings due to the recycling of usuable products, low energy cost based upon the fact that the unit is solar powered and protection of the environment in general from noxious chemicals (i.e. heavy metals—lead, mercury, arsenic) and potential carcinogenic material such as chloroform, carbon tetrachloride and benzene based ring structures.

Generally most industrial organic solvents can be recovered in SOPWETS even containing impurities or organic solids or other organic solvents of higher molecular weight, higher boiling point or higher vapor pressure. Classes of industrial organic solvents include hydrocarbons, chlorinated hydrocarbons, alcohols, ethers, esters, ketones glycols, amines, nitro-compounds and miscellaneous compounds (acetic acid, cresols).

Separation of organic compounds using SOPWETS can be accomplished simultaneously in three ways;
1. Dissolved solids precipitate as their soluability is exceeded during evaporation of solvent.
2. Collection of distilled solvent in product collection bottle. Collection of solvent will be most volatile of all solvents present.
3. Initial collection of least volatile solvent in secondary reservoir (with eventual collection in new product collection bottle with the aid of the solvent migrator).

The primary object of the present invention is to provide a system which overcomes the problems and deficiencies associated with the previous disposal of excess chemicals, by-products and other waste in chemical and related forms.

Another object of the present invention is to provide a waste effluent treatment and a solvent recovery system which consists of a primary reservoir, solvent migrator, automatic leveling and recirculation element, a solar distilling unit, a bonnet and mirrors.

Another object of the present invention is to provide a waste effluent treatment and solvent recovery system which is not prone to fall into disrepair; which operates in a self-contained manner and which is compact in nature.

A still further object of the present invention is to provide a waste effluent treatment and solvent recovery system which is adaptable to and capable of use in industrial as well as educational environments by assembly of a multiplicity of systems in parallel.

Yet another object of the present invention is to provide a device of the class indicated which is capable of the functions referred to and which is based upon the principals of solar distillation, capillary action, and chemical recovery.

Other objects will appear hereinafter.

SUMMARY OF THE INVENTION

In accordance with the present invention, a waste effluent treatment solvent recovery system is composed of a primary reservoir located on an appropriate support system, such as a stand, combined with and connected to a solvent migrator including an adjustable trough, an automatic leveling device and a frame for such device as well as an absorbant material (e.g. filter paper pad) to be used in coordination with a secondary reservoir further contained within a solar distilling unit constructed in two pieces consisting of the secondary reservoir and a collecting dome comprised of glass panels and containing collecting troughs running to the exterior of the unit and further comprising a bonnet located at the top of the collecting dome for shape purposes and optional mirrors to recapture and collect reflected light from the collecting dome.

DETAILED DESCRIPTION OF THE DRAWINGS

Figure 1:
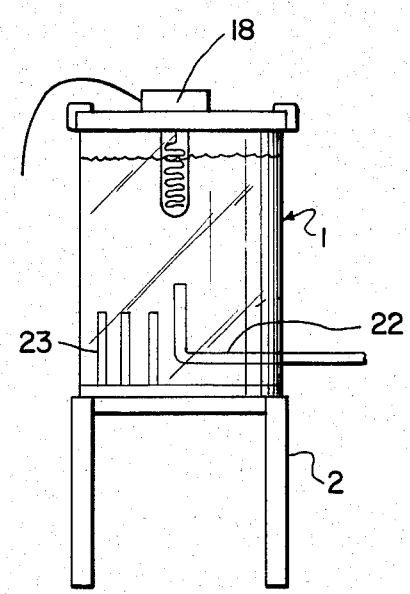
FIG. 1 is a front view of the primary reservoir and support system including an optional auxilliary heater and connecting means for joining the primary reservoir to the remainder of the unit.

Referring now to FIGS. 1 through 10 and to the details of the construction and operation of the invention, numerals one through twenty-three comprise the parts of the system. The primary reservoir 1 acts as a holding tank and as a chemical reaction site to provide for recovery of metals by metal recovery means 23 (any material that will displace the metal ion in solution in compliance with the electromotive series) such as copper and silver from aqueous solutions. In addition, by limiting the amount of solution introduced into the secondary reservoir 4, there is permitted an efficient heating of a minimum amount of solution in that reservoir.

Initiation of the solution departing the primary reservoir 1 occurs by predetermination of the level of solution in the secondary reservoir 4. This is accomplished with the aid of gravity derived from placing the primary reservoir 1 in an elevated position on a support element 2 such as a stand. The solution is conveyed by conveyance tubing 22 and charges a trough 3 constructed above the secondary reservoir 4. Recirculation of the stagnant solution from the secondary reservoir 4 occurs by suction tubing 5.

Associated with (it may be draped) the trough 3 is an absorbent material 6, such as an absorbent paper or cloth, which directs the overflow of solution to the secondary reservoir 4. The absorbant material 6 is preferably located parallel to the rays of the sun. Concurrently by capilliary action, the solution progresses up the absorbent material 6, toward the trough. This enables the vapor phase of the solution to be maintained at a higher percentage in the top of the apparatus. Also, especially in relation to organics, the greater the available surface area of the absorbent material, the more efficient the operation.

Thus, this relationship results in the most volatile components rising first. As new solution is added to the trough 3, absorbent material is washed and, again, the most volatile components rise first. Therefore, components can be selectively collected in their order of volatility.

Figure 8:
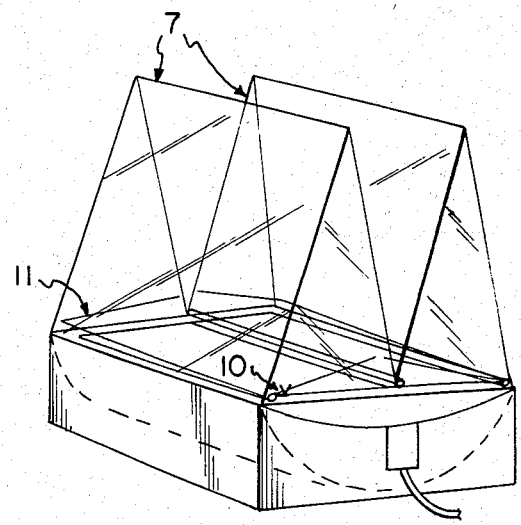
FIG. 8 is a perspective view of a modification of the solar distilling unit showing a double dome system.
Figure 9:
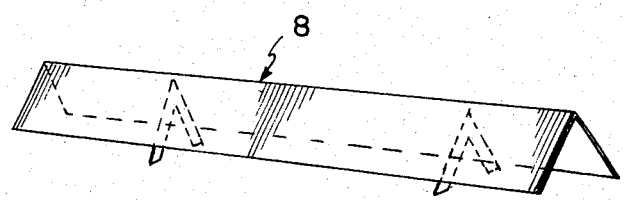
FIG. 9 is a perspective view of the bonnet adapted to cover the top of the glass collecting dome.
Figure 10:
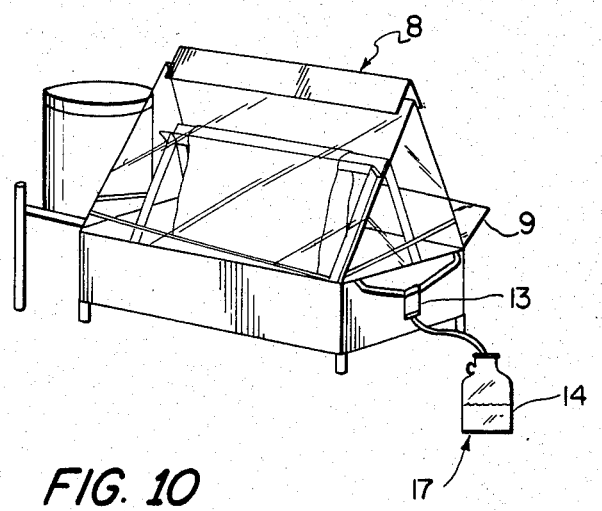
FIG. 10 is a perspective view of the entire waste effluent treatment and solvent recovery system.
Figure 11:
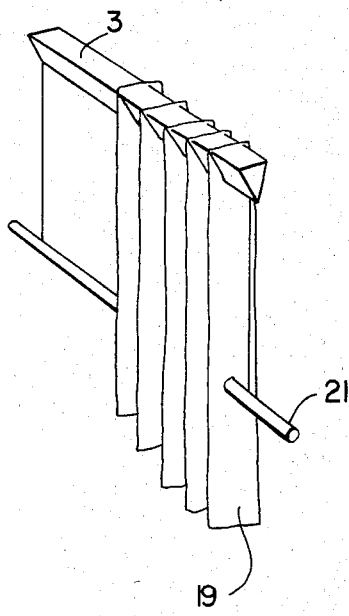
FIG. 11 is a perspective view of an alternative frame for the leveling device combined with the new solution trough and absorbant material in strip form suspended therefrom.

Solar distillation of solvents is accomplished by placing the apparatus in direct sunlight; following the steps recited and adding the structure described hereinafter to form a solar unit. Thus, the solvent migrator described hereinbefore will be located within a solar unit and together they will produce solar distillation of solvents. The glass collecting dome 7 is generally in the form of a pyramid comprised of glass panels. There may be a plurality of domes such as is illustrated in FIG. 8. A multiplicity of collecting domes 7 would certainly increase surface area and yield. In any event, the collecting dome 7 collects the condensed vapor with the help of bonnet 8 which shades the upper portion of the dome to increase the temperature differential between the glass and the interior of the apparatus. Outside temperatures are 32 degrees centigrade and create 55–58 degrees centigrade in the interior. The temperature in the bonnet area would range in the 40 degree centigrade area. Additionally, mirrors 9 can also be used on the outside to collect additional light and correct for any reflected light from the angle of the glass.

The high angle tilt of the glass (55–60 degrees) allows very small drops to overcome their adhesive properties to the glass and flow with the aid of gravity into collecting troughs 11 set at an angle of 4 degrees to aid in flow.

Figure 4:
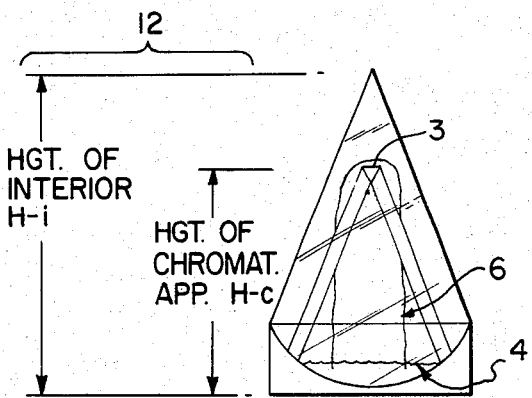
FIG. 4 is an end view of the solar distilling unit combined with the solvent migrator.

There is a directly proportional ratio between the height of the solvent migrator in the interior of the solar distilling unit and the ability of efficiently collect solvents. This ratio is referred to H-i to H-c as illustrated in FIG. 4 and referred to by numberal 12. This proportionality can also be demonstrated by the fact that the higher the vapor pressure and molecular weight of a solvent, the closer the solvent migrator apparatus must be to the collecting surfaces (or the ratio of H-i to H-c equal to one). This fact can be used to an advantage in separating mixtures of solvents with very different properties by determining the solvent migrator height to selectively collect the more volatile substances while concentrating the less volatile ones in the secondary reservoir.

The collection solution once in the collecting trough 11 travels by gravity to the exterior of the system. It passes through a chemical trap 13 designed specifically for that application. The chemical trap 13 contains activated charcoal or anion/cation resin in cases where pure water is desired. In organic solvent recovery situtations, anhydrous calcium chloride is used to dry the water from the organic. The remaining solution is the product 14 collected in any suitable container 17.

The solvent migrator relys upon capillary action (sometimes called wicking action) in operation. When recovering aqueous inorganic and organic solutions in the solar unit, operating temperature will range anywhere from ambient temperature to approximately 52° C. With such a temperature range, classical distillation (i.e., heat the solution to be distilled until the boiling point is reached of its components) has to be adapted to move the solvent being distilled closer to the collection point to compensate for cooler operating temperatures; and lack of control over the temperature.

The solvent migrator is the key to this compensation. As the secondary reservoir 4 is filled, the solvent migrator's absorbant material causes the solution to rise in the SOPWETS and bring the solvent vapor closer to the collecting surface (dome 7). Further separation can be accomplished in this manner as more volatile organics will be collected first with less volatile organics being concentrated in the secondary reservoir 4 or eventually be collected by the collecting dome 7 with the aid of the solvent migrator's capillary action.

Distillation of water will operate more efficiently by increasing the humidity and subsequently the collection of product with the solvent migrator. Distillation of organics is virtually impossible without the solvent migrator since a majority of organics will only form a vapor cloud over the secondary reservoir 4 and not rise in the collection dome 7 high enough to condense on the surface thereof.

Alternatively, the absorbant material 6 can be cut into strips 19 to be suspended at right angles from the frame 15, with the advantage that there is nearly a total reduction in sunlight reflected back upon the glass in the solar unit frame. Thus, absorbant material 6, when parallel to the light ray results in a lower temperature of the glass panels being maintained to support continued condensation.

Figure 12:
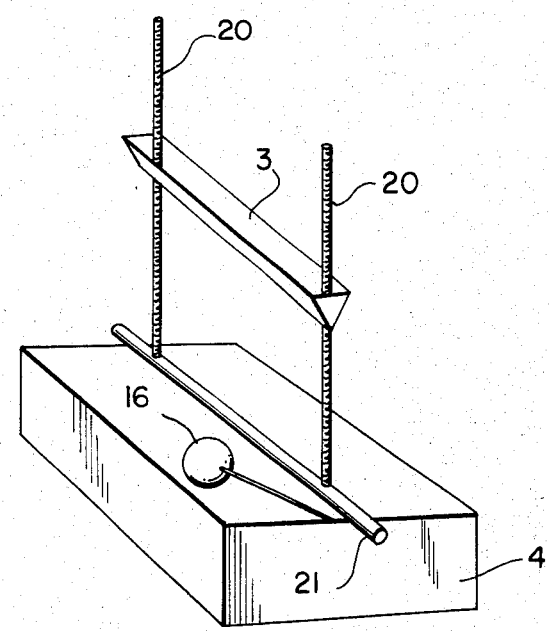
FIG. 12 is a perspective view of an alternative leveling device frame arrangement.

Additionally, the frame 15 may simply be a single support element 20 such as a rod combined with the trough 3. If the support element 20 is a screw, guide element 21 is used and the leveling device 16 suspended from the guide element. The location of the trough as in FIG. 12, would be adjustable.

Figure 2:
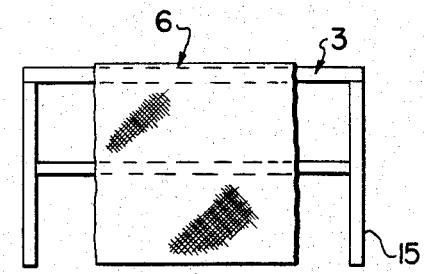
FIG. 2 is a front view of the automatic leveling device frame and absorbant material forming the solvent migrator.
Figure 3:
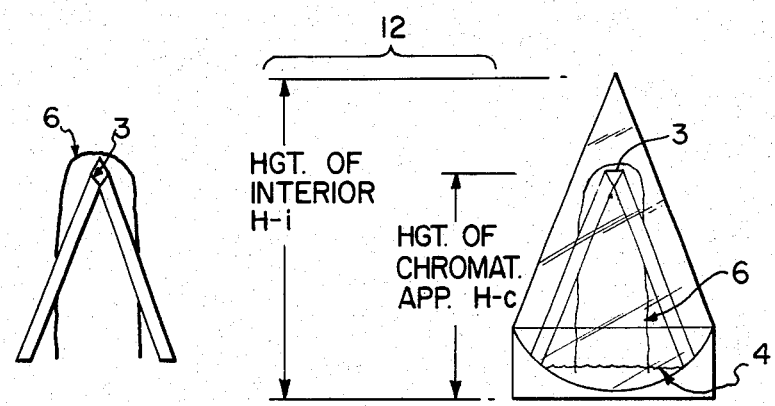
FIG. 3 is an end view of the automatic leveling device frame and absorbant material forming the solvent migrator.
Figure 5:
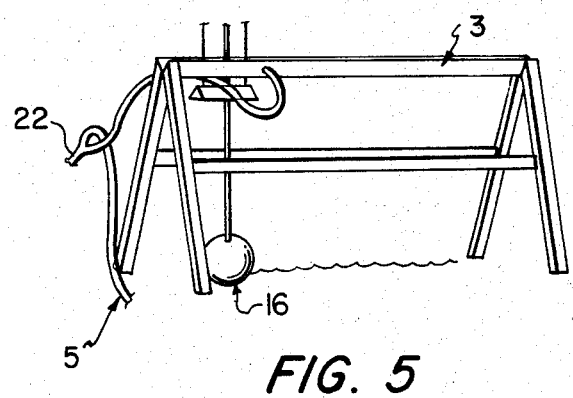
FIG. 5 is a frontal view of the automatic leveling device frame with a leveling means structually in place in relation thereto.
Figure 6:
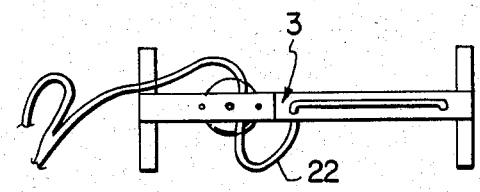
FIG. 6 is a top view of the automatic leveling device frame and associated structure.
Figure 7:
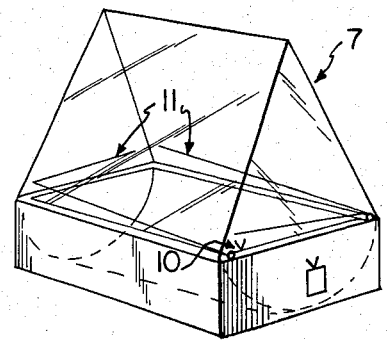
FIG. 7 is a perspective view of the solar distilling unit.

In further reference to the initiation of solution leaving the primary reservoir 1, reference is made to FIG. 2 which discloses the frame for automatic leveling device 16 illustrated in FIG. 5. The automatic leveling device 16 may be in a form of a leveling ball which clamps or depresses conveyancing tube 22, thus obstructing or restricting the flow of new effluent from the primary reservoir 1, until the level drops sufficiently to release pressure on the tube 22 and allow new solution to enter. The new solution charges the trough 3 built into the solvent migrator referred to hereinbefore.

As stated before the primary reservoir 1 is a holding tank for waste effluent, a site for chemical reaction for metal recovery; and it is further an auxilliary heating site to increase efficiency during the winter months. In this regard, numeral 18 represents an optional auxilliary electrical heater. As well, the primary reservoir 1 is a source of power, through gravity, to maintain the flow of liquid to the solar distillation apparatus through the solvent migrator.

The secondary reservoir 4 may be constructed from steel, or similar material, glass, depending on the nature of the solution to be employed. That is whether or not the solution is highly acidic or an extremely solubilizing organic material.

From the foregoing, it may be seen that the present invention provides a useful device in the form of a waste effluent treatment and solvent recovery system which overcomes the problems and difficulties of the past and provides an economical and efficient system for recycling usable products and which involves low energy costs and use and which improves the environment.

This present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description and all changes which come within the meaning and range of the equivalency of the claims are intended to be embraced therein.

What is claimed is:

1. A chemical waste effluent treatment and solvent and solids recovery system for inorganic and organic solutions comprising:

a support;

a primary reservoir on said support receiving solution to be treated;

a solar distilling unit adjacent said support including:

a secondary reservoir;

a frame extending above said secondary reservoir and being adjustable in height, a trough on an uppermost portion of said adjustable frame, absorbent means draped over said trough and both sides of said frame and extending downwardly into said reservoir, said absorbent means being aligned parallel to the rays of sun, means connecting said primary reservoir to said trough for gravity fluid flow from said primary reservoir to said trough, automatic leveling means attached to said frame and operatively associated with said connecting means for maintaining a desired level of solution in said secondary reservoir by continuously regulating flow through said connecting means from said primary reservoir to said trough whereby overflow from said trough flows down said absorbent means to said secondary reservoir, a dome comprising glass panel covering and enclosing on both opposite sides of said secondary reservoir, said frame, said trough, and said absorbent means, said panels being aligned with said frame and serving as a condensing surface for solvent evaporated from said absorbent means, said dome having a peak, collecting troughs at a lowermost portion of said panels for receiving and collecting condensed solvent, at least one auxilliary mirror located adjacent outside said dome reflecting additional sunlight thereinto, and a bonnet shading said peak of said dome and the uppermost portions on both sides thereof, the ratio of height of the frame carrying the absorbent means to the height of the interior of said dome being adjustable to enable selective collection of more volatile solvents;

chemical trap means for additional treatment of said distilled water;

transfer means for transferring said distilled solvent from said collecting troughs to said chemical trap means; and product collection means connected to said chemical trap means for collecting the additionally treated distilled solvent.

2. The system according to claim 1, further comprising means for recirculating solvent from said secondary reservoir to said trough.

* * * * *